Feb. 29, 1944.  R. K. HELLMANN  2,342,735
APPARATUS FOR LOADING GRANULAR MATERIAL INTO RECEPTACLES
Filed Nov. 18, 1943  4 Sheets-Sheet 4
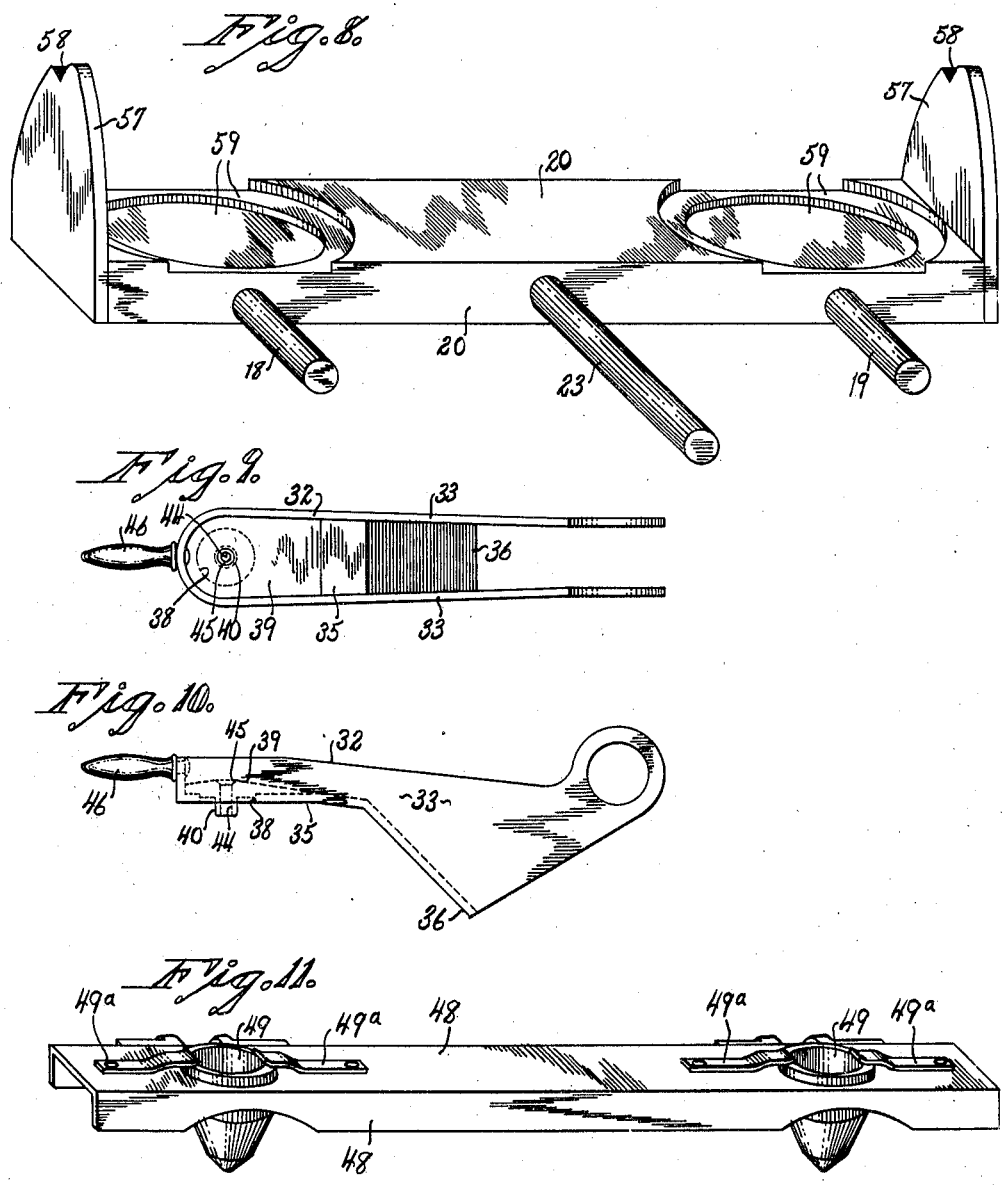
Inventor
Reinhard K. Hellmann
By
Seymour Earle Nichols
Attorneys Patented Feb. 29, 1944

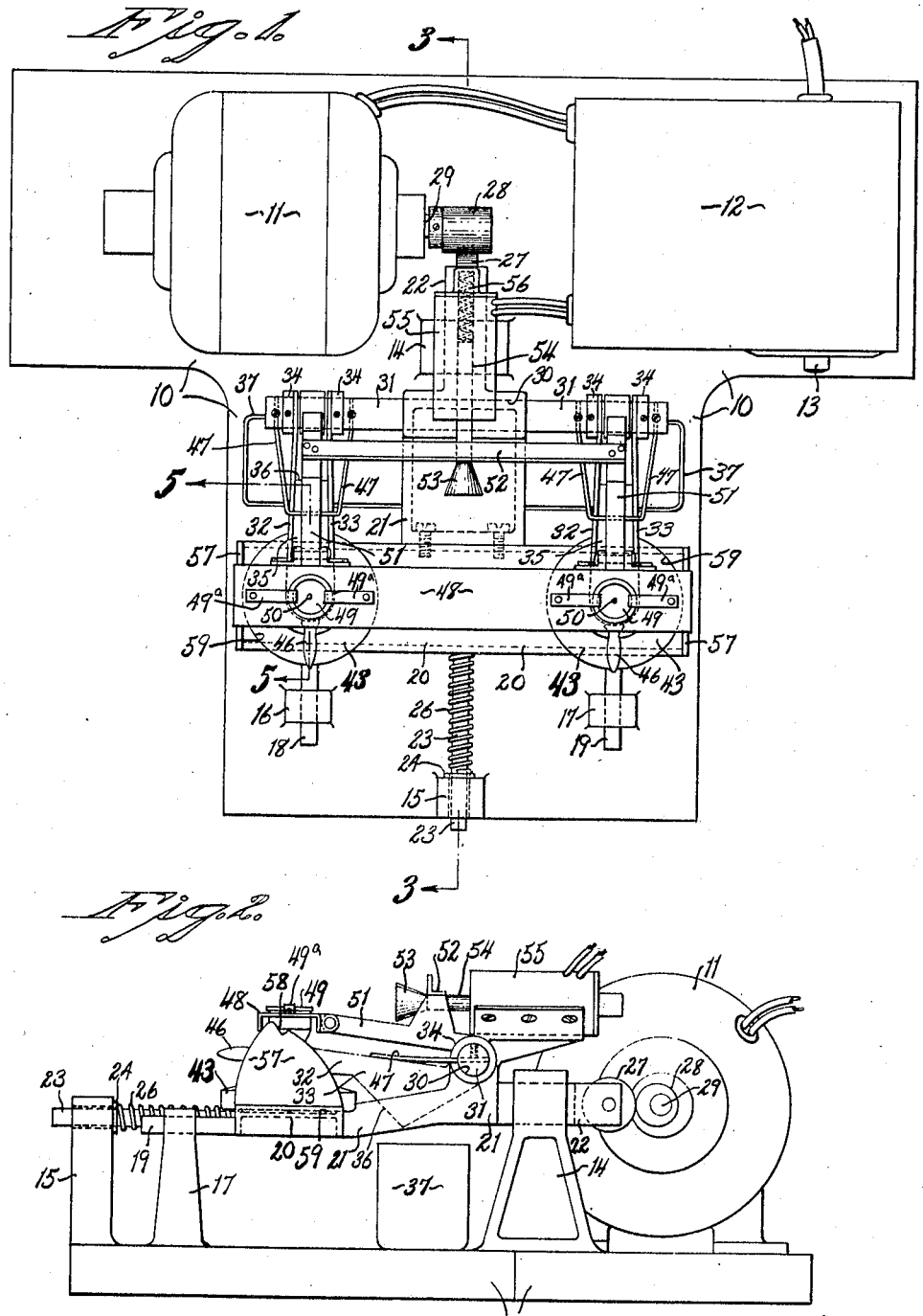

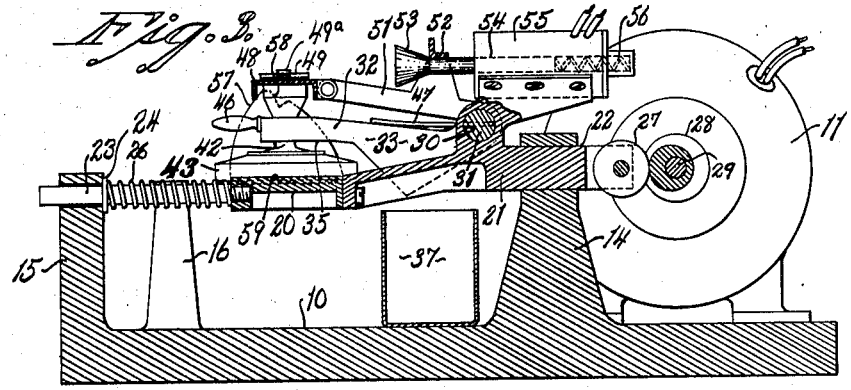

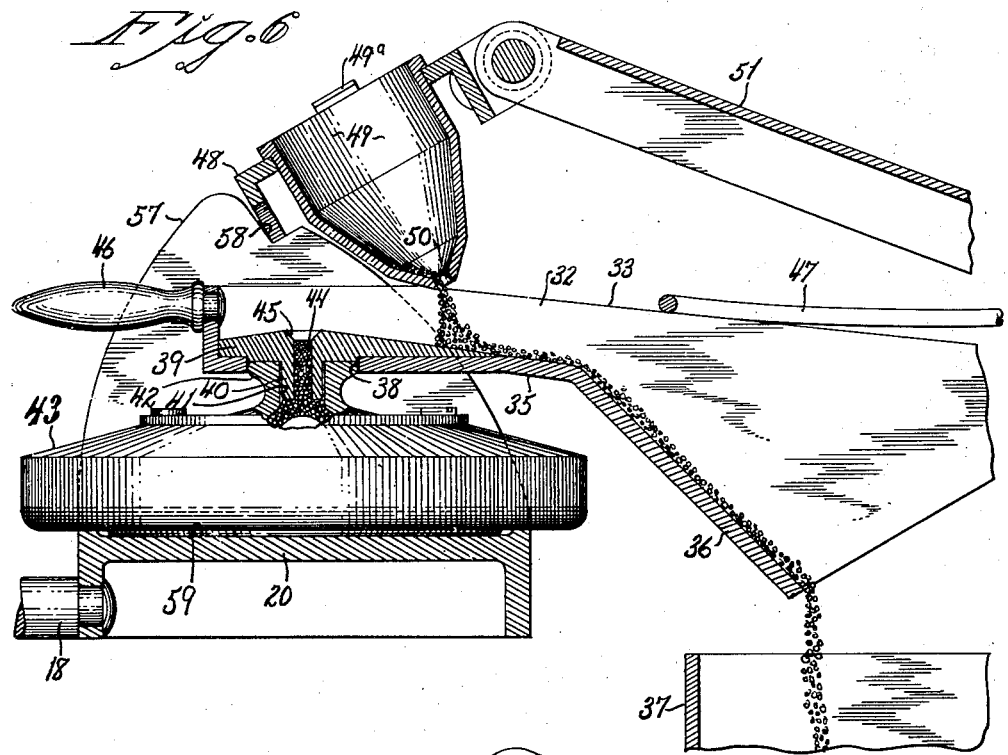
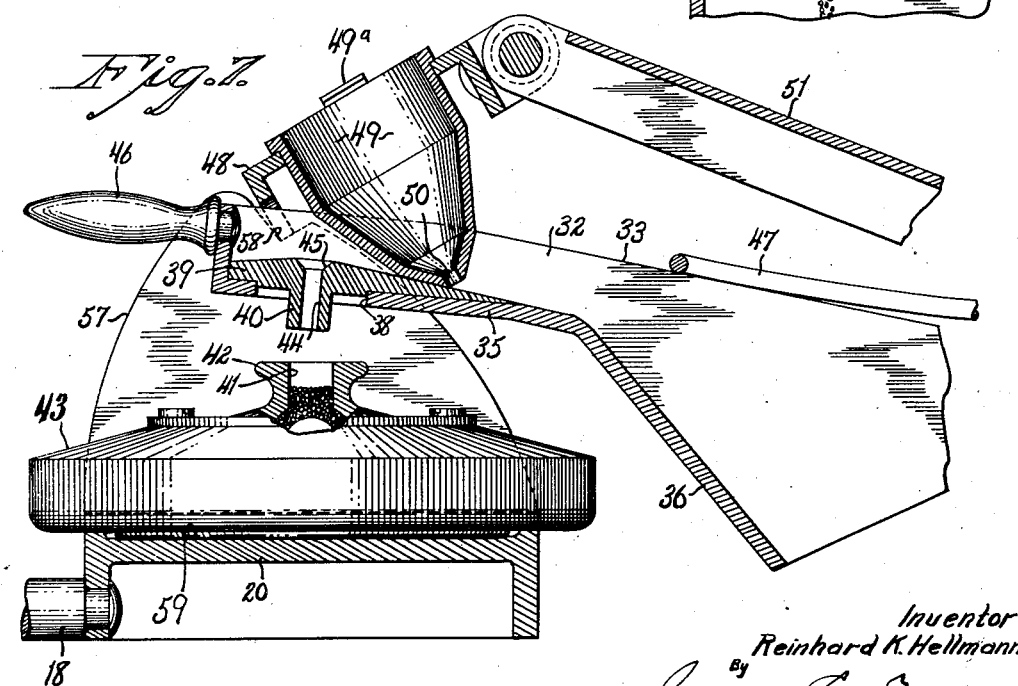

2,342,735

UNITED STATES PATENT OFFICE 2,342,735

APPARATUS FOR LOADING GRANULAR MATERIAL INTO RECEPTACLES

Reinhard K. Hellmann, Meriden, Conn., assignor to Great American Industries, Inc., Meriden, Conn., a corporation of Delaware Application November 18, 1943, Serial No. 510,758

11 Claims. (Cl. 226—72)

The present invention relates to improvements in loading-apparatus or -devices, and relates more particularly to improvements in loading-apparatus of the type designed and adapted to load or charge granular material into receptacles. While suited for other purposes, the present invention is especially designed for loading granular carbon or the like into telephone transmitters, microphones, and the like.

One of the objects of the present invention is to provide a superior apparatus for loading granular material into receptacles, which is characterized by uniformity of the loading-action with respect to a series of containers sequentially subjected to the action of the apparatus.

Another object of the present invention is to provide a superior apparatus of the character described whereby containers may be loaded with granular material up to a predetermined level without requiring the weighing of the charges of granular material.

A further object of the present invention is to provide a superior loading-apparatus by means of which granular carbon, or the like, may be loaded into transmitters and microphones and accurately leave a predetermined void therein free of such granular material.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a top or plan view of one form of loading-apparatus embodying the present invention, with the parts shown in the positions which they assume preparatory to the loading of charges of granular material into the transmitters or containers;

Fig. 2 is an edge view thereof, with the time-switch omitted;

Fig. 3 is a transverse sectional view taken on the line 3—3 of Fig. 2;

Fig. 4 is a view corresponding to Fig. 3 but showing the storage-cups tilted as a result of the energization of the lifting-solenoid;

Fig. 5 is a broken transverse sectional view taken on the line 5—5 of Fig. 1 and showing granular material in the course of being loaded or charged into a transmitter;

Fig. 6 is a view corresponding to Fig. 5 but showing the storage-cup tilted and in the process of discharging its excess contents into the diverting-chute;

Fig. 7 is a view similar to Fig. 6 but showing the measuring-member lifted to clear the microphone;

Fig. 8 is a perspective view of the container-holder, together with its latching-plates;

Fig. 9 is a top or plan view of the unit comprising the diverting-chute and the measuring-member;

Fig. 10 is a side view thereof; and

Fig. 11 is a perspective view of the bar-like cup-holder, together with its storage-cups.

The particular apparatus herein chosen for purposes of making clear one form of the present invention, includes a base-plate 10, generally of T-shaped form, and having mounted upon its rear portion a driving-motor 11 and an automatic time-switch 12 having a starting-button 13.

Substantially-centrally intermediate the driving-motor 11 and the time-switch 12, the base-plate 10 is provided with an upstanding lug 14 in line with which, but spaced forwardly therefrom, is an upstanding lug 15 located adjacent the front edge of the base-plate 10. Flanking the lug 15 on each of the respective opposite sides thereof respectively are upstanding lugs 16 and 17. Respectively reciprocating in the upper portions of the lugs 16 and 17 are two horizontal guide-rods 18 and 19 both rigid with and forwardly projecting from a horizontal bar-like container-holder 20.

Rigidly connected to and projecting rearwardly from the central portion of the container-holder 20 is a bracket 21 formed at its rear with a cylindrically-contoured horizontal guide-rod 22 reciprocating in the apertured upper end of the lug 14 before referred to. In combination with the two guide-rods 18 and 19 before referred to, the guide-rod 22 serves to mount the container-holder 20 in a position well above the upper surface of the base-plate 10 and with capacity for reciprocation in a direction from front to rear with respect to the said base-plate.

Rigid with and extending forwardly from the central portion of the container-holder 20, is a spring-guiding rod 23 having its forward end freely passing through the apertured upper end of the upstanding lug 15 adjacent the forward edge of the base-plate 10. Fitting over the forward portion of the rod 23 and located against the rear face of the lug 15, is a washer 24. Encircling the spring-guiding rod 23 at a point intermediate the back face of the washer 24 and the front face of the container-holder 20, is a helical return-spring 26 exerting a constant but yielding effort to shift the container-holder and the parts carried thereby in a direction rearwardly of the apparatus.

The rear end of the guide-rod 22 of the bracket 21 is bifurcated and has mounted therein a roller 27 adapted to be engaged by an eccentric cam 28 mounted upon the outer end of the drive-shaft 29 of the driving-motor 11. At each revolution of the driving-motor 11 (which may, for instance, be at the rate of 1800 R. P. M.), the cam 28 will force the roller 27, guide-rod 22, and bracket 21 forwardly, and through the intermediary of the said parts, will similarly force the container-holder 20 and the parts carried thereby forwardly against the tension of the return-spring 26. When in its turning movement, the high point of the cam 28 moves rearwardly, the return-spring 26 will assert itself and move the container-holder 20 and the parts carried thereby rearwardly, preparatory to another forward movement occasioned by the rotation of the cam 28. In this manner, the container-holder 20 and associated parts will be vibrated in a horizontal direction. Preferably, the tension of the return-spring 26 is such that the vibrating parts have a resonant frequency substantially equal to the speed of the cam 28 to thereby minimize the power required to maintain the vibration referred to.

The bracket 21 before referred to is formed at a point above the plane of its unitary guide-rod 22 with a horizontal passage 30 extending in substantial parallelism with the drive-shaft 29 of the motor 11 and with the bar-like container-holder 20. Extending through and rigidly fixed in the passage 30 just referred to is a rod 31 having a length slightly less than the length of the container-holder 20.

Pivotally connected at their respective rear ends to the rod 31 above referred to, are two corresponding diverting-chutes 32—32 respectively located on opposite sides of the bracket 21. The pivotal connection of each of the chutes 32—32 to the rod 31 is effected by perforating (Fig. 10) the respective opposite side-walls 33—33 to receive the adjacent end of the rod 31. As thus mounted, each of the diverting-chutes 32—32 is capable of being swung in a vertical plane around the rod 31 as a center. To retain a given diverting-chute against displacement lengthwise of the rod 31, two complemental stop-collars 34—34 are secured to the rod 31 adjacent the respective opposite side-walls 33—33 of the given diverting-chute.

Each of the diverting-chutes 32—32 includes in addition to its two side-walls 33—33 which are integrally joined at the front, a bottom-wall 35 having its rear portion directed downwardly and rearwardly to provide a pour-off lip 36 overhanging a removable receptacle 37 resting on the upper surface of the base-plate 10 and having a length sufficient to extend beneath both of the said diverting-chutes 32—32.

Adjacent its forward end in a position over the longitudinal-center line of the container-holder 20, each diverting-chute is formed in its bottom wall with a central aperture 38 into which downwardly projects a portion of what might aptly be termed a measuring-member designated by the reference character 39. The measuring-member 39 just referred to is brazed or otherwise rigidly secured to the forward portion of its complemental diverting-chute 32 though obviously, if desired, the parts 32 and 39 may be cast or otherwise formed in one piece.

Centrally depending from each measuring-member 39 and extending through the aperture 38 in the complemental diverting-chute 32, is a measuring-sleeve 40 which is designed and adapted to extend within the charging-opening of a container which it is desired to fill with granular material. In the instance shown, the measuring-sleeve 40 is designed and adapted to fit within the charging-opening 41 formed in the projecting neck-portion 42 forming a feature of a telephone transmitter generally designated by the reference character 43, all as is shown in Figs. 5, 6 and 7.

Extending vertically through the measuring-member 39 and its measuring-sleeve 40 is a loading-passage 44 flared at its upper end to provide a throat 45. The cross-sectional area and the length of the depending measuring-sleeve 40 are such as to occupy a predetermined volume of space when located in the charging-opening 41 or its equivalent, for purposes as will hereinafter appear.

At its forward end, each diverting-chute is provided with a handle 46 by means of which the outer end of the said chute and the parts carried thereby may be manually swung upwardly around the rod 31 as a center. For the purpose of yieldingly holding the measuring-sleeves 40 of the measuring-members 39 downwardly in the charging-opening 41 of the transmitter 43, as is shown particularly well in Figs. 5 and 6, two substantially-U-shaped springs 47—47 are employed, one of which is located adjacent each of the diverting-chutes 32—32. The cross-reach of a given spring 47 bears upon the upper edges of the side-walls 33—33 of a given diverting-chute 32 and has its rear ends anchored in the rod 31.

Located above and extending in substantial parallelism with the container-holder 20 is a bar-like cup-holder 48. Mounted in and extending downwardly through the cup-holder 48 with capacity for limited vertical movement, are two (more or less) storage-cups or -members 49—49, each of which is yieldingly held down by a pair of springs 49a—49a. The two said storage-cups 49—49 are respectively located over one of the two measuring-members 39 and each of the said storage-cups is contracted at its lower end so as to fit within the throat 45 of the adjacent loading-passages 44, as is shown particularly well in Fig. 5. In its lower end, each of the funnel-like storage-cups 49—49 is formed with a loading-passage 50 adapted to communicate with the upper or outer portion of the loading-passage 44 in the adjacent measuring-member 39, as is also particularly well shown in Fig. 5.

Pivotally connected to the rear edge of the cup-holder 48 and extending rearwardly therefrom are two corresponding lever-arms 51—51 pivoted at their respective rear ends to the rod 31 before referred to.

Rigidly attached at its respective opposite ends to the two lever-arms 51—51 and extending therebetween is a horizontal lifting-bar 52 having its forward lower edge normally resting upon the conical surface of a cam-like lifting-head 53 mounted upon the forward end of a plunger-like armature 54. The said armature 54 is formed of soft iron or other suitable magnetic material and is adapted to reciprocate axially within a lifting-solenoid 55. The lifting-solenoid 55 is supported by an extension of the bracket 21 before referred to and, as is well known in the art, includes a return-spring 56 indicated in Figs. 3 and 4, and exerting a constant but yielding effort to move the armature 54 forwardly.

For the purpose of latching the cup-holder 48 in a tilted position, as indicated in Figs. 4, 6 and 7, a pair of latch-plates 57—57 are employed and which are respectively located and rigidly fastened to the respective opposite ends of the container-holder 20. Each of the latch-plates 57—57 is formed with a latching-notch 58 adapted to receive the front lower corner of the cup-holder 48 in a manner as will hereinafter appear.

When the driving-motor 11 is started, its eccentric cam 28 will act in conjunction with the helical return-spring 26 to reciprocate or vibrate the bracket 21 and hence also vibrate the parts carried thereby, including the features 31, 32, 39, 40, 43, 48, 49, 51, 52, 54, 55 and 57.

When the lifting-solenoid 55 is energized, it will draw rearwardly upon its armature 54 and thereby cause the lifting-head 53 to act through the lifting-bar 52 to swing both of the lever-arms 51—51 upwardly and thereby tilt the cup-holder 48 and the storage-cups 49—49 carried thereby.

Preferably and as shown, the driving-motor 11 and the lifting-solenoid 55 are both controlled by the time-switch 12 in such manner that the motor 11 would operate for a predetermined length of time, and at some desired point during the operation of the motor 11, the lifting-solenoid 55 would be energized to discharge its function of tilting the storage-cups 49—49.

For purposes of making clear the operation of the apparatus illustrated in the accompanying drawings, let it be assumed that two containers, such as the telephone transmitters 43—43, are installed in the recesses 59—59 in the container-holder 20. Let it further be assumed that the parts are in the position indicated in Figs. 1, 2, 3 and 5. A charge of granular carbon (or other desired granular material) will be poured into each of the storage-cups 49—49 in an amount in excess of what is known to be required to fill one of the telephone transmitters 43 or other suitable container. The driving-motor 11 may now be started to coincidentally vibrate the transmitters 43, measuring-members 39 and storage-cups 49—49 (together with the associated parts). In this manner, the granular carbon will be caused to flow downwardly from each of the storage-cups 49—49 through the respective loading-passages 50 thereof and through the respective loading-passages 44 of the measuring-members 39 and thence into the complemental transmitter 43 or other desired container. The vibration will effect the packing of the granular carbon to the desired extent into the container (transmitter 43 in the instance shown).

While the driving-motor 11 is still effecting the vibration of the parts as before described, the lifting-solenoid 55 may be energized to thereby draw the armature 54 and lifting-head 53 rearwardly. The movement just referred to will effect the tilting of the cup-holder 48 and its storage-cups 49—49 into the positions in which they are especially well shown in Fig. 6. The tilting of the storage-cups 49—49 will also carry the surplus granular carbon still contained in the said cups, to a position for discharge into the adjacent diverting-chute 32 at a point removed from the complemental loading-passage 44. Due to the continued vibration of the parts, the surplus granular carbon will be vibrated out of the storage-cups 49—49 and thence conveyed by the diverting-chutes 32—32 into the receptacle 37. Meanwhile, a large percentage of the granular carbon remaining in the throat 45 of each of the measuring-members 39 will be vibrated out and carried by the adjacent diverting-chute 32 into the receptacle 37. The conditions just referred to may be considered as being shown in Fig. 6.

When the cup-holder 48 is tilted as above described, it will be latched in such position by the entry of its forward lower portion into the respective latching-notches 58 of the two latch-plates 57.

Following the conveyance by the diverting-chutes 32—32 of all surplus granular carbon into the receptacle 37, the driving-motor 11 may be stopped. This stoppage may be automatically effected or may be effected by a manually-operated switch, if desired. Each of the measuring-members 38 may be lifted clear of the adjacent container such as the transmitter 43 so that the parts assume substantially the positions in which they are shown in Fig. 7. The lifting of a given measuring-member 39 will remove its measuring-sleeve 40 from the charging-opening 41 of the transmitter 43, thus permitting such granular carbon as had previously remained in the loading-passage 44 to drop into the said transmitter. Due to the fact that the bulk of the measuring-sleeve 40 had previously pre-empted a larger volume of the charging-opening 41 than the volume of granular carbon remaining in its loading-passage 44, the level of the granular carbon in the transmitter 43 will be automatically left at a level below the outer end of the charging-opening 41 as is illustrated in Fig. 7.

While the parts are in the relative positions illustrated in Fig. 7, the microphones 43 may be removed one at a time from beneath their complemental diverting-chutes and replaced with a fresh transmitter, following which, the forward end of the adjacent diverting-chute may be lowered so that the adjacent measuring-sleeve is inserted into the charging-opening of the fresh transmitter. The cup-holder 48 may now be unlatched by manually lifting its outer edge and restored to the position in which it is particularly well shown in Fig. 5 preparatory to receiving a fresh charge of granular carbon for repeating the loading of the fresh transmitter or other desired container.

While, in the instance shown, the entire storage-cups or -members 44 are vibrated, the desired effect may be achieved if only the outlet ends thereof are vibrated.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An apparatus of the class described, including in combination: a measuring-member having a measuring-sleeve provided with a loading-passage extending therethrough, the said measuring-sleeve being constructed and arranged to fit within the charging-opening of a container in such manner that granular material may be fed into the said container through the loading-passage in the said measuring-sleeve; a hollow storage-member associated with the said measuring-member and also having a loading-passage normally communicating with an outer portion of the loading-passage of the said measuring-member to supply granular material into the latter, the said hollow storage-member being shiftable to bring its loading-passage out of registry with the loading-passage of the said measuring-member to divert surplus granular material in the said storage-member to a location elsewhere than into the loading-passage in the said measuring-member; supporting-means movably supporting the said storage-member in position wherein its loading-passage communicates with the loading-passage in the said measuring-member; and vibrating-means coincidentally vibrating the said measuring-member, the said storage-member, and the container being charged with granular material.

2. An apparatus of the class described, including in combination: a measuring-member having a measuring-sleeve extending downwardly therefrom and provided with a substantially-vertical loading-passage, the said measuring-sleeve being constructed and arranged to extend downwardly within the charging-opening of a container in such manner that granular material may be fed downwardly into the said container through the loading-passage in the said measuring-sleeve; a hollow storage-member located above the said measuring-member and having a loading-passage normally communicating with an upper portion of the loading-passage of the said measuring-member to supply granular material into the latter, the said hollow storage-member being shiftable to bring its loading-passage out of registry with the loading-passage of the said measuring-member to divert surplus granular material in the said storage-member to a location elsewhere than into the loading-passage in the said measuring-member; supporting-means movably supporting the said storage-member in position wherein its loading-passage communicates with the loading-passage in the said measuring-member; and vibrating-means coincidentally vibrating the said measuring-member, the said storage-member, and the container being charged with granular material.

3. An apparatus of the class described, including in combination: a measuring-member having a measuring-sleeve provided with a loading-passage extending therethrough, the said measuring-sleeve being constructed and arranged to fit within the charging-opening of a container in such manner that granular material may be fed into the said container through the loading-passage in the said measuring-sleeve; a diverting-chute located adjacent the said measuring-member; a hollow storage-member associated with the said measuring-member and also having a loading-passage normally communicating with an outer portion of the loading-passage of the said measuring-member to supply granular material into the latter, the said hollow storage-member being shiftable to bring its loading-passage out of registry with the loading-passage of the said measuring-member to divert surplus granular material in the said storage-member into the said diverting-chute; supporting-means movably supporting the said storage-member in position wherein its loading-passage communicates with the loading-passage in the said measuring-member; and vibrating-means coincidentally vibrating the said measuring-member, the said storage-member, and the container being charged with granular material.

4. An apparatus of the class described, including in combination: a measuring-member having a measuring-sleeve provided with a loading-passage extending therethrough, the said measuring-sleeve being constructed and arranged to fit within the charging-opening of a container in such manner that granular material may be fed into the said container through the loading-passage in the said measuring-sleeve; a vibratable diverting-chute located adjacent the said measuring-member; a hollow storage-member associated with the said measuring-member and also having a loading-passage normally communicating with an outer portion of the loading-passage of the said measuring-member to supply granular material into the latter, the said hollow storage-member being shiftable to bring its loading-passage out of registry with the loading-passage of the said measuring-member to divert surplus granular material in the said storage-member into the said diverting-chute; supporting-means movably supporting the said storage-member in position wherein its loading-passage communicates with the loading-passage in the said measuring-member; and vibrating-means coincidentally vibrating the said measuring-member, the said diverting-chute, the said storage-member, and the container being charged with granular material.

5. An apparatus of the class described, including in combination: a measuring-member having a measuring-sleeve extending downwardly therefrom and provided with a substantially-vertical loading-passage, the said measuring-sleeve being constructed and arranged to extend downwardly within the charging-opening of a container in such manner that granular material may be fed downwardly into the said container through the loading-passage in the said measuring-sleeve; a diverting-chute located adjacent the said measuring-member; a hollow storage-member located above the said measuring-member and having a loading-passage normally communicating with an upper portion of the loading-passage of the said measuring-member to supply granular material into the latter, the said hollow storage-member being shiftable to bring its loading-passage laterally out of registry with the loading-passage of the said measuring-member to divert surplus granular material in the said storage-member into the said diverting-chute; supporting-means movably supporting the said storage-member in position wherein its loading-passage communicates with the loading-passage in the said measuring-member; and vibrating-means coincidentally vibrating the said measuring-member, the said storage-member, and the container being charged with granular material.

6. An apparatus of the class described, including in combination: a measuring-member having a measuring-sleeve extending downwardly therefrom and provided with a substantially vertical loading-passage, the said measuring-sleeve being constructed and arranged to extend downwardly within the charging-opening of a container in such manner that granular material may be fed downwardly into the said container through the loading-passage in the said measuring-sleeve; a vibratable diverting-chute located adjacent the said measuring-member; a hollow storage-member located above the said measuring-member and having a loading-passage normally communicating with an upper portion of the loading-passage of the said measuring-member to supply granular material into the latter, the said hollow storage-member being shiftable to bring its loading-passage laterally out of registry with the loading-passage of the said measuring-member to divert surplus granular material in the said storage-member into the said diverting-chute; supporting-means movably supporting the said storage-member in position wherein its loading-passage communicates with the loading-passage in the said measuring-member; and vibrating-means coincidentally vibrating the said measuring-member, the said diverting-chute, the said storage-member, and the container being charged with granular material.

7. An apparatus of the class described, including in combination: a vibratable measuring-member having a measuring-sleeve provided with a loading-passage extending therethrough, the said measuring-sleeve being constructed and arranged to fit within the charging-opening of a container in such manner that granular material may be fed into the said container through the loading-passage in the said measuring-sleeve; a diverting-chute organized as a unit with the said measuring-member and vibratable therewith; a hollow storage-member associated with the said measuring-member and also having a loading-passage normally communicating with an outer portion of the loading-passage of the said measuring-member to supply granular material into the latter, the said hollow storage-member being shiftable to bring its loading-passage out of registry with the loading-passage of the said measuring-member to divert surplus granular material in the said storage-member into the said diverting-chute; supporting-means movably supporting the said storage-member in position wherein its loading-passage communicates with the loading-passage in the said measuring-member; and vibrating-means coincidentally vibrating the unitary measuring-member and diverting-chute, the said storage-member, and the container being charged with granular material.

8. An apparatus of the class described, including in combination: a vibratable measuring-member having a measuring-sleeve extending downwardly therefrom and provided with a substantially-vertical loading-passage, the said measuring-sleeve being constructed and arranged to extend downwardly within the charging-opening of a container in such manner that granular material may be fed downwardly into the said container through the loading-passage in the said measuring-sleeve; a diverting-chute organized as a unit with the said measuring-member and vibratable therewith; a hollow storage-member located above the said measuring-member and having a loading-passage normally communicating with an upper portion of the loading-passage of the said measuring-member to supply granular material into the latter, the said hollow storage-member being shiftable to bring its loading-passage laterally out of registry with the loading-passage of the said measuring-member to divert surplus granular material in the said storage-member into the said diverting-chute; supporting-means movably supporting the said storage-member in a position wherein its loading-passage communicates with the loading-passage in the said measuring-member; and vibrating-means coincidentally vibrating the unitary measuring-member and diverting-chute, the said storage-member, and the container being charged with granular material.

9. An apparatus of the class described, including in combination: a measuring-member having a loading-passage constructed and arranged to register with the charging-opening of a container in such manner that granular material may be fed into the said container through the loading-passage in the said measuring-member; a hollow storage-member associated with the said measuring-member and having a loading-passage normally communicating with an outer portion of the loading-passage of the said measuring-member to supply granular material into the latter for conduction into the container being charged, the said hollow storage-member being shiftable to bring its loading-passage out of registry with the loading-passage of the said measuring-member to divert surplus granular material in the said storage-member to a location elsewhere than into the loading-passage of the said measuring-member; supporting-means movably supporting the said storage-member in position wherein its loading-passage communicates with the loading-passage in the said measuring-member; and vibrating-means coincidentally vibrating the said measuring-member, the said storage-member, and the container being charged with the granular material.

10. An apparatus of the class described, including in combination: a measuring-member having a measuring-sleeve provided with a loading-passage extending therethrough, the said measuring-sleeve being constructed and arranged to fit within the charging-opening of a container in such manner that granular material may be fed into the said container through the loading-passage in the said measuring-sleeve; a hollow storage-member associated with the said measuring-member and also having a loading-passage normally communicating with an outer portion of the loading-passage of the said measuring-member to supply granular material into the latter, the said hollow storage-member being shiftable to bring its loading-passage out of registry with the loading-passage of the said measuring-member to divert surplus granular material in the said storage-member to a location elsewhere than into the loading-passage in the said measuring-member; supporting-means movably supporting the said storage-member in position wherein its loading-passage communicates with the loading-passage in the said measuring-member; vibrating-means coincidentally vibrating the said measuring-member, the said storage-member, and the container being charged with granular material; time-controlled stop-means constructed and arranged to automatically stop the aforesaid vibratory action after the lapse of a predetermined period; and time-controlled shifting-means automatically shifting the loading-passage of the said storage-member out of registry with the loading-passage of the said measuring-member before the said time-controlled stop-means acts to effect the stoppage of the said vibratory action.

11. A method for charging granular electro-conductive material into telephone transmitters and the like, which method includes: connecting the outlet of a storage-member with the charging-opening of a transmitter; coincidentally vibrating both the said storage-member and the said transmitter to cause the granular material to be charged into the latter from the former; disconnecting the outlet of the said storage-member from the charging-opening of the said transmitter to divert excess granular material from the said storage-member to a location elsewhere than into the said charging-opening; and vibrating the said transmitter together with its charge of granular material after the aforesaid disconnection has been effected between the transmitter and the said storage-member.

REINHARD K. HELLMANN.